3,511,869
PRODUCTION OF MALONONITRILE
Jacob Rosin, Maplewood, and Frank Ang, Kearny, N.J., assignors to Chris-Craft Industries, Inc., a corporation of Delaware
No Drawing. Filed Sept. 26, 1967, Ser. No. 670,762
Int. Cl. C07c 121/12
U.S. Cl. 260—465.2
3 Claims

ABSTRACT OF THE DISCLOSURE

Certain alkanephosphonyldihalide compounds have been found to be unusually effective reagents for the conversion of amides to the corresponding nitriles by the abstraction of a molecule of water from the amide group. Structurally, these alkanephosphonyldihalides are characterized by the formula $R[P(O)X_2]$, where R represents an alkane or substituted-alkane, and X represents a halogen group. Using these alkanephosphonyldihalide compounds as a dehydrating agent to abstract water from an amide group, cyanoacetamide is converted to malononitrile in very high yields and without the usual difficulties associated with this reaction. An improved process for the production of malononitrile from cyanoacetamide has been developed on the basis of this technique.

INTRODUCTION

This invention relates to the converison of amides to the corresponding nitriles by the acid-induced elimination of water from the amide group. The invention is based on the discovery that certain alkanephosphonyldihalide compounds are capable of abstracting a molecule of water from an amide group without forming any precipitate when this water of dehydration undergoes further reaction with the alkanephosphonyldihalide. The reaction between an alkanephosphonyldihalide compound with an amide yields a reaction mixture composed primarily of the corresponding nitrile and the hydrolyzates which are formed when the alkanephosphonyldihalide reacts with the water of dehydration eliminated (or "abstracted," the two terms being used interchangeably) from the amide group, from which reaction mixture the nitrile may be recovered, generally in very high yields. Using this technique, the invention provides an improved process for the production of malononitrile from cyanoacetamide.

PRIOR PROCESSES FOR PREPARING MALONONITRILE

Malononitrile, which is a commercially important chemical used as an intermediate and as a highly selective solvent for certain polymers, is generally prepared by the acid-induced elimination of water from cyanoacetamide in accordance with the following reaction sequence:

NC—CH₂—CONH₂→NC—CH₂—CN+H₂O    (1)

Most commercial processes for the production of malononitrile are based on reacting cyanoacetamide with phosphorus oxytrichloride in the presence of a solvent (the most commonly used solvent being ethylene dichloride), during which reaction the water of dehydration which is abstracted from the amide group of the cyanoacetamide further reacts with the phosphorus oxytrichloride to liberate hydrogen chloride and form a precipitate of the hydrolyzates of POCl₃. Because the precipitating hydrolyzates which are formed when the phosphorus oxytrichloride reacts with this water of dehydration are somewhat viscous and sticky, large amounts of various salts (such as NaCl) are frequently suspended in the reaction mixture as adsorbants for these precipitating hydrolyzates.

As a practical matter, the POCl₃-induced elimination of water from cyanoacetamide to form malononitrile requires large amounts of solvent and presents many plant engineering problems, many of which are caused by the tendency of the precipitating hydrolyzates of POCl₃ to undergo caking and to coat the walls of the reactor, which, in turn, results in poor heat transfer. At present, these problems are solved only at the expense of employing additional unit operations, which include filtration of the reaction mixture to remove the relatively large volume of precipitate, washing the precipitate with additional solvent to recover the malononitrile adsorbed on the filter cake, and recovering the large volumes of solvent by distillation, all of which operations cumulatively increase the cost of producing malononitrile.

SUMMARY OF THE INVENTION

During an investigation of the conversion of cyanoacetamide to malononitrile to obviate the usual problems associated with this reaction, it was found that certain alkanephosphonyldihalide compounds react with cyanoacetamide to form malononitrile in very high yields. Structurally, these alkanephosphonyldihalide compounds are characterized by the formula $R[P(O)X_2]$, where R represents an alkane or substituted-alkane, and X represents a halogen group. Upon reaction with cyanoacetamide, these alkanephosphonyldihalide compounds eliminate (or abstract) water from the amide group of the cyanoacetamide (which forms malononitrile) and then, in turn, further react with the abstracted water to form the corresponding alkanephosphonic acids and anhydrides. Because these hydrolyzates of the alkanephosphonyldihalide do not precipitate under the reaction conditions, malononitrile may be recovered from the resultant reaction mixture in very high yields.

Based on these discoveries, the invention provides an improved process for the production of malononitrile which comprises (a) reacting cyanoacetamide with at least one alkanephosphonyldihalide compound having a structure represented by the formula $R[P(O)X_2]$, where R represents an alkane or substituted-alkane, and X represents a halogen group, in an amount sufficient to dehydrate the amide group of the cyanoacetamide to a nitrile group, thereby forming a reaction mixture composed primarily of malononitrile and the hydrolyzates formed when the alkanephosphonyldihalide reacts with the resultant water of dehydration, and (b) recovering malononitrile from the resultant reaction mixture. By using the process of the invention to produce malononitrile, all of the technical problems which are usually associated with the POCl₃-induced conversion of cyanoacetamide to malononitrile may be avoided, since the process of the invention does not result in the formation of any precipitate under the reaction conditions nor does this process require any solvent, since the cyanoacetamide dissolves in the alkanephosphonyldihalide.

BASIC PARAMETERS OF THE INVENTION

Basically, only two steps are required to produce malononitrile from cyanoacetamide, in the first of which cyanoacetamide is reacted with the alkanephosphonyldihalide compound, following which malononitrile is recovered from the resultant reaction mixture. If desired, the remaining hydrolyzates (which is probably a mixture of alkanephosphonic acids and anhydrides) may be halogenated to regenerate the alkanephosphonyldihalide, which, in turn, may be reused.

Alkanephosphonyldihalides

Selection of a suitable alkanephosphonyldihalide compound for the dehydration of cyanoacetamide in accordance with the process of the invention may be made from those alkanephosphonyldihalide compounds having a structure characterized by the formula $R[P(O)X_2]$, where R is an alkane or substituted-alkane, and X is a halogen group. Among the various alkenephosphonyldihalides which have been used in the process of the invention, either separately or as a mixture of alkanephosphonyldihalide compounds, are propanephosphonyldichloride, propane-bis-(phosphonyldichloride), butanephosphonyldichloride, butane-bis-(phosphonyldichloride), pentanephosphonyldichloride, pentane-bis-(phosphonyldichloride), hexanephosphonyldichloride, and hexane-bis-phosphonyldichloride. Halogen-substituted alkanephosphonyldihalides, such as chloropropanephosphonyldichloride, may also be used as the dehydrating agent. To facilitate recovery of the malononitrile from the reaction mixture, the particular alkanephosphonyldihalide used in the reaction preferably should be such that its hydrolyzates (i.e., alkanephosphonic acids and anhydrides) are characterized by melting points or mixed melting points below 150° C. When cyanoacetamide is reacted with these alkanephosphonyldihalides under suitable reaction conditions, the malononitrile may be vacuum distilled from the reaction mixture in practically quantitative yields.

Reaction mechanism

In theory, the reaction between an alkanephosphonyldihalide and cyanoacetamide can proceed in several ways, in all of which the driving force is the subsequent reaction between the water of dehydration (abstracted from the amide group of cyanoacetamide) and the alkanephosphonyldihalide. By way of illustration, the alkanephosphonyldihalide can react with equimolar quantities of the water of dehydration to form the corresponding alkanephosphonic anhydride, as shown in the following reaction between pentanephosphonyldichloride and water:

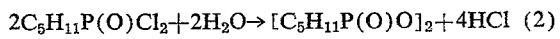

Alternatively, the alkanephosphonyldihalide can react with two moles of the water of dehydration to form the corresponding alkanephosphonic acid, as shown in the following reaction between pentanephosphonyldichloride and water:

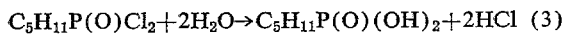

In both cases, the elimination of the hydrogen halide drives the reaction to completion. If the first reaction (Equation 2) predominates, then 1 mole of the alkanephosphonyldihalide should be required to convert cyanoacetamide to malononitrile. Conversely, if the second reaction (Equation 3) predominates, then only 0.5 mole of the alkanephosphonyldihalide should be required to convert cyanoacetamide to malononitrile.

To test which of these two reactions occur, cyanoacetamide was reacted with 0.5, 0.75 and 1.0 mole of pentanephosphonyldichloride, respectively, using identical reaction conditions. The results of these tests are summarized in that table below.

TABLE

Yields of malononitrile using varying amounts of pentane-phosphonyldichloride to dehydrate cyanoacetamide Mole percent of $C_5H_{11}P(O)Cl_2$:
Yield of malononitrile (percent of theory)

| | |
|---|---|
| 50 | 65.2 |
| 75 | 98.8 |
| 100 | 98.5 |

These tests show that both reactions occur during the dehydration of cyanoacetamide and, consequently, that the hydrolyzates of the alkanephosphonyldihalide are a mixture of the corresponding alkanephosphonic acid and alkanephosphonic anhydride.

Optimum reaction conditions

For optimum results, the dehydration of cyanoacetamide with an alkanephosphonyldihalide requires from about 50 to about 100 mole percent of the alkanephosphonyldihalide, the preferred range being from about 75 to about 100 mole percent of the alkanephosphonyldihalide. Experience has demonstrated that no solid precipitates form during the reaction or during the subsequent isolation of malononitrile by distillation from the reaction mixture, since the resultant alkanephosphonic acids and alkanephosphonic anhydrides produced by the subsequent reaction of the water of dehydration (abstracted from cyanoacetamide) and the particular alkanephosphonyldihalide are soluble in the reaction mixture and remain liquid during any subsequent work-up of the malononitrile.

Since cyanoactamide dissolves in the alkanephosphonyldihalide, the reaction may be carried out without any solvent. The use of a solvent, while not necessary, generally facilitates control of the reaction. Any solvent which is used in this reaction should, of course, be non-reactive under the particular reaction conditions employed. Among such solvents are acetonitrile, ethylene dichloride, benzene, toluene, and similar solvents.

No particular strictures need be mentioned with respect to the temperature of the reaction or the time required for completion. If a solvent is employed, the reaction may be carried out at or below the reflux temperature of the solvent, which allows the reaction to be operated over a wide range of temperatures. Since the driving force of the reaction is removal of hydrogen halide from the reaction mixture, various techniques may be used to accelerate removal of the gaseous hydrogen halide from the reaction mixture. The completion of the reaction will be signaled by cessation of the evolution of gaseous hydrogen halide from the reaction mixture.

EXAMPLES

The following examples are illustrative of the high yields which are obtained when malononitrile is produced by reacting cyanoacetamide with at least one alkanephosphonyldihalide compound to convert the amide group of cyanoacetamide to a nitrile group in accordance with the invention:

Example 1

One hundred seventy-five grams (175 g., 1 mole) of butanephosphonyldichloride and 84 g. (1 mole) of cyanoacetamide were heated together in 100 g. of acetonitrile, while stirring, during which the cyanoacetamide went into solution and hydrogen chlyoride gas began to evolve when the temperature of the reaction mixture was about 70° C. The temperature of the reaction mixture was slowly increased to 100° C. over a period of approximately 1 hour, at the end of which period HCl evolution had ceased. The reaction mixture was then distilled under vacuum, yielding 65 g. (98.5% of theory) of malononitrile which was collected as distillate at 95° C. at 8 mm. When the reaction was repeated under identical conditions but without the solvent, the yield of malononitrile was 56 g. or 84.8% theory. In both instances the residue, which remained liquid when the still temperature was above 90° C., represented a mixture of butanephosphonic acid and its anhydride which could be converted back to butane phosphonyldichloride (for reuse as a dehydrating agent) by chlorination with phosphorous pentachloride.

Example 2

Two hundred and three grams (203 g., 1 mole) of hexanephosphonyldichloride and 84 g. (1 mole) of cyanoacetamide were heated together in 100 g. of acetonitrile, while stirring. When the temperature of the reaction mixture was about 70° C., hydrogen chloride gas began to evolve as a result of the reaction between the water of dehydration abstracted from the cyanoacetamide and the hexanephosphonyldichloride. Heating was continued for approximately 1 hour, during which period the temperature of the reaction mixture slowly increased to about 100° C. and the evolution of HCl ceased. The reaction mixture was then distilled under vacuum, yielding 65.1 g. of malononitrile (B.P. 95° C./8 mm.) or 98.6% of theory.

Example 3

Using the reaction conditions described in Example 1, malononitrile was prepared by dehydrating 84 g. (1 mole) of cyanoacetamide with 185 g. of a mixture of alkanephosphonyldichlorides consisting of 90% by weight of hexanephosphonyldichloride and 10% by weight of hexane-bis-(phosphonyldichloride), the composition of which mixture was computed on the basis of a chlorine analysis. The yield of malononitrile was 65.1 g. or 98.5% of theory.

Example 4

Eighty-four grams (84 g., 1 mole) of cyanoacetamide, 140.5 g. (0.75 mole) of pentanephosphonyldichloride, and 100 g. of acetonitrile were refluxed for 1 hour (reflux temperature=75° C. to 95° C.), during which period 55 g. of hydrogen chloride gas evolved. The acetonitrile was topped off atmospherically, after which the reaction mixture was vacuum distilled at 15 mm. (still temperature=160° C.) to recover malononitrile which distills at 110° C. at 15 mm. The yield of malononitrile was 65.2 g., or 98.8% of theory. The setting point of the malononitrile distillate was 31.2° C.

We claim:

1. The process for the production of malononitrile which comprises (a) reacting cyanoacetamide with from about 50 to about 100 mole percent of at least one alkanephosphonyldichloride compound having a structure represented by formula $R[P(O)Cl_2]$, where R represents at lower alkane containing not less than 3 carbon atoms, at a temperature not exceeding the highest reflux temperature of the resultant reaction mixture and in an amount sufficient to dehydrate the amide group of the cyanoacetamide to a nitrile group, and (b) recovering malononitrile from the resultant reaction mixture.

2. The process for producing malononitrile according to claim 1, in which the hydrolyzates which are formed when the alkanephosphonyldichloride reacts with the water of dehydration abstracted from the cyanoacetamide are characterized by melting points below 150° C. thereby facilitating recovery of malononitrile from the reaction mixture by distillation.

3. The process for the production of malononitrile which comprises (a) reacting cyanoacetamide in the presence of a solvent with from about 75 to about 100 mole percent of at least one alkanephosphonyldichloride having a structure represented by the formula $R[P(O)Cl_2]$, where R represents a lower alkane containing from 3 to 6 carbon atoms, at a temperature not exceeding the highest reflux temperature of the resultant reaction mixture to dehydrate the amide group of the cyanoacetamide to a nitrile group, and (b) recovering malononitrile from the resultant reaction mixture.

References Cited

UNITED STATES PATENTS

| 2,799,697 | 7/1957 | Maxion | 260—465.8 XR |
| 3,300,526 | 1/1967 | Kirsch | 260—465.2 |

JOSEPH P. BRUST, Primary Examiner

U.S. Cl. X.R.

260—465.8

PO-1050
(5/69)

UNITED STATES PATENT OFFICE
CERTIFICATE OF CORRECTION

Patent No. 3,511,869           Dated    May 12, 1970

Inventor(s)   Jacob Rosin and Frank Ang

It is certified that error appears in the above-identified patent and that said Letters Patent are hereby corrected as shown below:

Column 3, line 4, "alkenephosphonyldihalides" should read --alkanephosphonyldihalides--.

Column 3, line 38, the chemical reaction (Equation 2) should read as follows:

-- $2C_5H_{11}P(O)Cl_2 + 2H_2O \rightarrow [C_5H_{11}P(O)O]_2O + 4HCl$ --

Column 4, line 51, "chlyoride" should read --chloride--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents